United States Patent [19]

Suuronen

[11] Patent Number: 4,899,829

[45] Date of Patent: Feb. 13, 1990

[54] APPARATUS FOR MAKING A SUBSTRATE FOR FOREST CULTIVATION

[76] Inventor: Otto Suuronen, 51330 Kortesalmi, Finland

[21] Appl. No.: 90,907

[22] Filed: Aug. 31, 1987

[30] Foreign Application Priority Data

Sep. 1, 1986 [FI] Finland .................................. 863530

[51] Int. Cl.⁴ ............................................. A01G 23/00
[52] U.S. Cl. ...................................... 172/30; 198/310; 239/685; 172/33
[58] Field of Search ................. 172/33, 134, 676, 833, 172/30; 198/310; 239/670, 685, 650; 56/DIG. 12; 222/622

[56]  References Cited

U.S. PATENT DOCUMENTS

| 15,640 | 9/1856 | Beeches | 198/310 |
| 181,460 | 8/1876 | McDonald | 198/310 |
| 376,731 | 1/1888 | Cottrell | 239/650 |
| 402,450 | 4/1889 | Hoffman | 198/310 |
| 804,474 | 11/1905 | Hoy | 198/310 |
| 1,429,563 | 9/1922 | Beuning | 172/33 |
| 2,341,486 | 2/1944 | Swertfeger | 56/DIG. 12 |
| 2,598,223 | 5/1952 | Chase | 198/310 |
| 4,174,578 | 11/1979 | Grillo | 198/310 |

FOREIGN PATENT DOCUMENTS 3001320 7/1980 Fed. Rep. of Germany ...... 172/833

0572235 10/1977 U.S.S.R. ................................. 172/33

Primary Examiner—Brooks H. Hunt
Assistant Examiner—Daniel Wasil
Attorney, Agent, or Firm—Lorusso & Loud

[57]  ABSTRACT

Apparatus for making a substrate for forest cultivation, which apparatus is designed to be drawn as a trailer behind a tractor or some comparable vehicle and most suitably has one wheel on each side of the trailer, the tracks of the wheels being essentially the same as those of the drawing vehicle and the trailer being also provided with a container for earth or comparable material, at the bottom of which container there is an opening through which the earth flows down on a conveyor unit arranged under the container. In present-day forest cultivation the tree plants are usually planted in unprepared soil. As a result, other vegetation deprives the trees of some of their vegetative power. With the invention, the problem is solved by that the conveyor unit comprises two belt conveyors driven by rollers, the transporting directions of which belt conveyors run crosswise to the trailer's direction of motion and away from the trailer's longitudinal axis, and that the axles of the driving rollers of the two belt conveyors are through rolls connected to the corresponding wheels of the trailer, by which means the rotatory movement of the wheels is transmitted to the belt conveyors driven by the rollers.

4 Claims, 2 Drawing Sheets

APPARATUS FOR MAKING A SUBSTRATE FOR FOREST CULTIVATION

This invention relates to an apparatus for making a substrate for forest cultivation, which apparatus is designed to be drawn as a trailer behind a tractor or some comparable vehicle and most suitably has a wheel on each side of the trailer, the tracks of the wheels being essentially the same as those of the drawing vehicle and the trailer being also provided with a container for earth or comparable material, at the bottom of which container there is an opening through which the earth flows down on a conveyor unit arranged under the container.

In present-day forest cultivation the tree plants are usually planted in unprepared soil. As a result, other vegetation deprives the trees of some of their power and their growth is slow. Besides, a precondition for this kind of forest cultivation is that plants of the desired tree species are available. As anyone skilled in the art knows, plants of certain tree species are hard to get because of their limited supply.

Research has shown that for the planting to be successful and the growth of the plant to be vigorous right from the beginning, it is more advantageous to plant also the forest tree plant in prepared soil, where the competing vegetation has been mechanically destroyed.

The object of this invention is to create an apparatus for making a substrate for forest cultivation, into which substrate it is possible to plant plants or where the tree seeds can be sown already during the preparing. An apparatus according to the invention is characterized by that the conveyor unit comprises two belt conveyors driven by rollers, the transporting directions of which belt conveyors run crosswise to the trailer's direction of motion and away from the trailer's longitudinal axis, and that the axles of the driving rollers of the two belt conveyors are through rolls connected to the corresponding wheels of the trailer, by which means the rotary movement of the wheels is transmitted to the belt conveyors driven by the rollers.

An advantageous embodiment of the invention is characterized in that each of the two belt conveyors is provided with two rollers, around which rollers the conveyor belt runs and of which rollers one is the said driving roller and the other a freely rotating idler.

Another advantageous embodiment of the invention is characterized in that the outer edges of the two belt conveyors are so positioned in relation to the furrows left in the soil by the wheels of the drawing vehicle, such as tractor, that the belt conveyors drop the earth into these furrows.

This invention provides many advantages. One of the most important is that unnecessary preparing of the soil is avoided, as the earth, which is taken from elsewhere, can be selected so that it is best suited to the plants. When every other space between the rows is left 3.5 m broad, they can be used as driving tracks at all phases of the timber harvesting without damaging the remaining trees. The cost of timber harvesting is reduced, and both the quantity and the quality of the trees are improved. A further advantage is that instead of producing and subsequently planting plants it is also possible to sow the seeds by hand on the earth directly at the site. The trees, which have been growing close together, can be quickly pruned to give saw and veneer wood of good quality. Surplus plants obtained by means of the invention can be relocated to fill gaps.

In the following, the invention is described in more detail by referring to the drawings, of which

PREFERRED EMBODIMENTS

Figure 1:
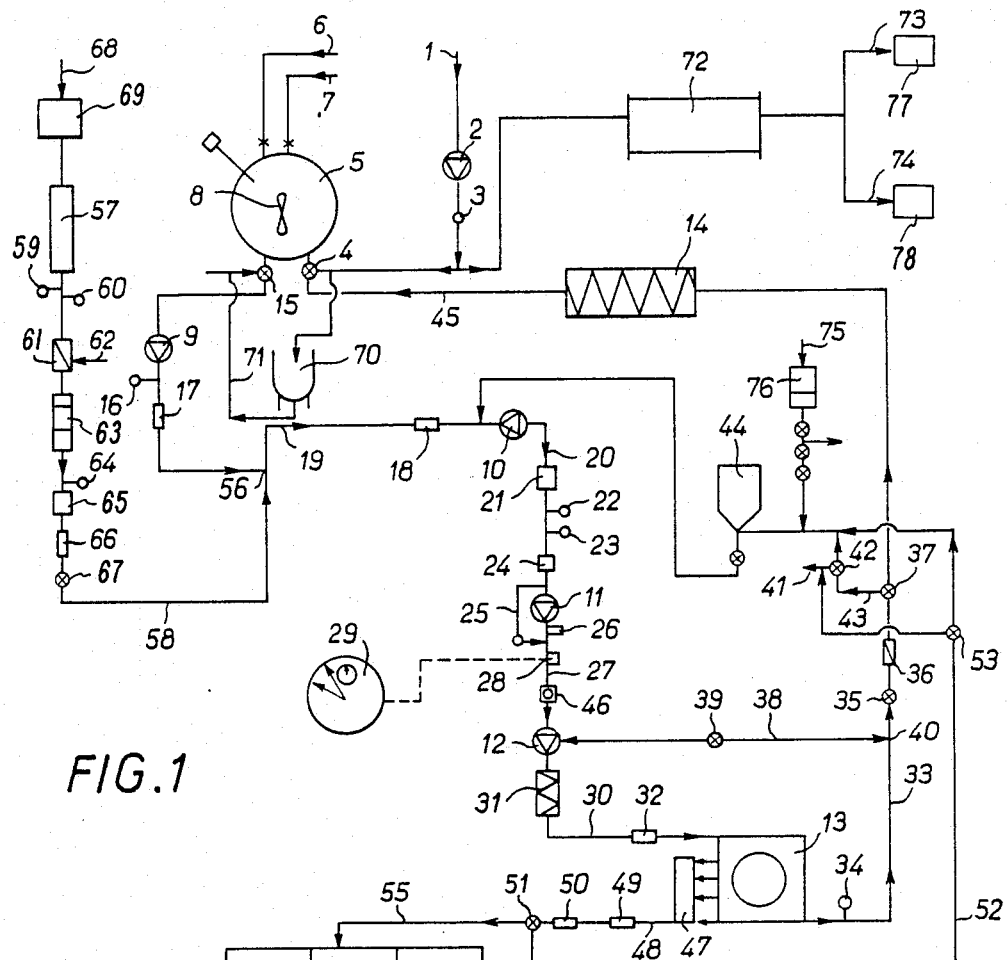
FIG. 1 shows from the side an apparatus according to the invention.
Figure 2:
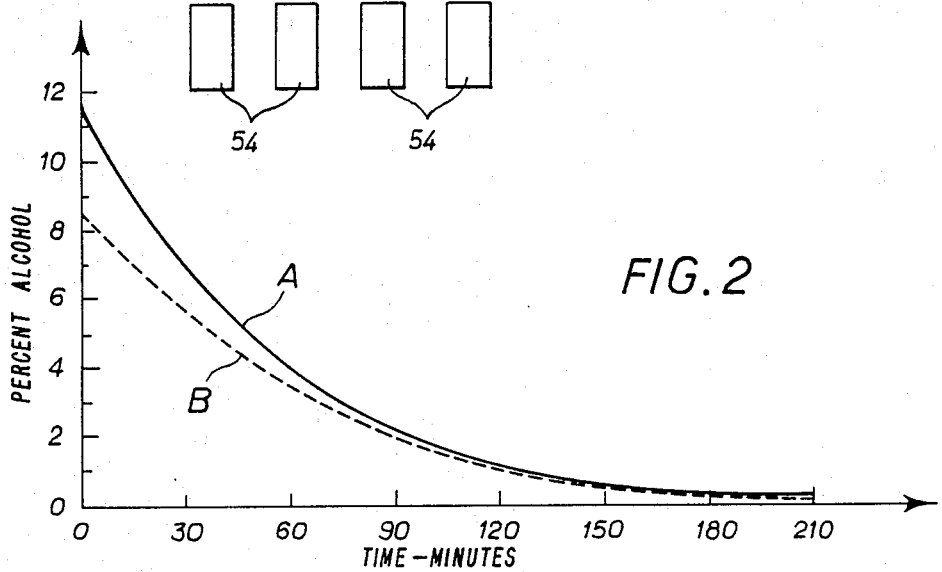
FIG. 2 shows from above, partially in section, an apparatus according to the invention.

FIG. 1 shows from the side a trailer according to the invention. The trailer can be coupled through a drawbar 1 for instance to a tractor or some comparable vehicle. The trailer is most suitably provided with two wheels 2, which are mounted on the trailer body, freely rotating in bearings. At the front section of the trailer, chain cutters 4 are installed for clearing the area of the rows of branchwood, moss and other possible undergrowth or rubbish before the dropping of the earth. The chain cutters are driven by V-belts 5 or comparable means, which in turn get their power from the power take-off shaft of the tractor.

On the trailer is installed a container 6, which is hopper-shaped and has at the bottom an opening 7 through which the material in the container, such as earth, flows down on a conveyor unit arranged under the container. The conveyor unit comprises most suitably two belt conveyors 8,9. Each belt conveyor is provided with one driving roller 10 and one freely rotating idler 11; the endless belt is arranged around them and they are essentially in the same longitudinal direction as the trailer. The axle 12 of the driving roller 10 is coupled to the roll 13, which is rotatingly connected to one wheel 2 of the trailer. The driving roller of the other belt conveyor is correspondingly connected to the other wheel of the trailer. When the trailer is being drawn, the wheels 2 rotate and at the same time make the rolls 13 rotate, which in turn through the axles 12 drive the driving rollers 10, which run the belt conveyors in the cross-direction of the trailer, away from its middle axis. While earth is flowing from the container 6 evenly on both conveyors 8,9, they transport it in opposite directions indicated by arrows 14 and 15.

The preparation of the soil for forest cultivation is done with an apparatus according to the invention so that first the rear wheels of the drawing vehicle, such as a tractor, form the furrows F into the soil. After that the rotating chain cutters 4 of the trailer remove the above-mentioned undesired branchwork and corresponding materials from the furrows. The belt conveyors 8,9 drop earth into the furrows. It is obvious that for the earth to fall into the furrows the belt conveyors should end essentially over the furrows. Finally the wheels 2 of the trailer press the earth ready for the planting. The trail of the trailer should be the same as that of the rear wheels of the tractor.

With an apparatus according to the invention is created a forest where trees are grown in dense rows (the distance between the rows is the same as the trail of the tractor, i.e. about 2–3 m) in a weedless substrate. The plant nutrients and soil improvement materials, such as wood ashes etc., have been mixed into the earth at the transporting stage. Naturally, the invention also permits the sowing of tree seeds to be done even with several tree species. On a substrate created by this means it is possible to sow a forest as desired, irrespective of the quality of the soil. For instance pines can be grown in exuberant soil if the plants are dense enough and the quality of the wood can be regulated by appropriately thinning. The growth of disturbing grass is prevented with a thick earth layer that has no grass seeds or roots.

It is obvious to a person skilled in the art that the invention is not restricted to the embodiments described above, but can be varied within the scope of the following patent claims.

I claim:

1. Apparatus for making a substrate for forest cultivation, which apparatus is designed to be drawn as a trailer behind a drawing vehicle said drawing vehicle and said trailer having at least one wheel on each side, the tracks of the trailer wheels being essentially the same as those of the drawing vehicle and the trailer being also provided with a container for earth, at the bottom of which container there is an opening through which the earth flows down onto a conveyor unit arranged under the container, wherein the conveyor unit comprises two belt conveyors driven by rollers, the transporting directions of which belt conveyors run crosswise to the trailer's direction of motion and away from the trailer's longitudinal axis, and wherein the axles of the driving rollers of the two belt conveyors are through rolls connected to the corresponding wheels of the trailer, by which means the rotary movement of the wheels is transmitted to the belt conveyors driven by the rollers.

2. Apparatus according to claim 1, wherein each of the two belt conveyors is provided with two rollers, round which rollers the conveyor belt runs and of which rollers one is the said driving roller and the other a freely rotating idler.

3. Apparatus according to claim 1, wherein the outer edges of the two belt conveyors are so positioned in relation to the furrows left in the soil by the wheels of the drawing vehicle that the belt conveyors drop the earth into these furrows.

4. Apparatus according to claim 1, comprising two chain cutters for clearing undergrowth from the tracks before earth is dropped, wherein each chain cutter is positioned on the trailer behind a wheel of the drawing vehicle and in front of a belt conveyor, each of said chain cutters being driven by a belt powered by a take-off shaft.

* * * * *